(12) United States Patent
Westermark

(10) Patent No.: US 8,289,528 B2
(45) Date of Patent: Oct. 16, 2012

(54) TILT SENSOR FOR A MEASURING INSTRUMENT

(75) Inventor: Magnus Westermark, Ekerö (SE)

(73) Assignee: Trimble AB, Danderyd (SE)

( * ) Notice: Subject to any disclaimer, the term of this patent is extended or adjusted under 35 U.S.C. 154(b) by 84 days.

(21) Appl. No.: 12/735,975

(22) PCT Filed: Mar. 7, 2008

(86) PCT No.: PCT/EP2008/052780
§ 371 (c)(1),
(2), (4) Date: Aug. 27, 2010

(87) PCT Pub. No.: WO2009/109233
PCT Pub. Date: Sep. 11, 2009

(65) Prior Publication Data
US 2011/0001986 A1    Jan. 6, 2011

(51) Int. Cl.
*G01B 11/14* (2006.01)
(52) U.S. Cl. .............................. 356/615; 356/614
(58) Field of Classification Search .......... 356/614–615, 356/622, 138–155
See application file for complete search history.

(56) References Cited

U.S. PATENT DOCUMENTS

| | | | |
|---|---|---|---|
| 3,617,131 A | 11/1971 | Taguchi | |
| 4,136,955 A | 1/1979 | Aeschlimann et al. | |
| 5,933,393 A | 8/1999 | Kitajima | |
| 6,088,090 A | 7/2000 | Hoshi et al. | |
| 7,388,658 B2 * | 6/2008 | Glimm | 356/139.1 |
| 7,646,339 B2 | 1/2010 | Green et al. | |
| 2007/0180716 A1 | 8/2007 | Hertzman | |
| 2008/0036646 A1 | 2/2008 | Green et al. | |

FOREIGN PATENT DOCUMENTS

| | | |
|---|---|---|
| EP | 1 645 846 | 4/2006 |
| WO | WO 96/39613 | 12/1996 |
| WO | WO 99/10714 | 3/1999 |
| WO | WO 2004/057269 | 7/2004 |
| WO | WO 2006/074929 | 7/2006 |
| WO | WO 2009/109233 | 9/2009 |

OTHER PUBLICATIONS

International Search Report.

* cited by examiner

*Primary Examiner* — Tri T Ton
(74) *Attorney, Agent, or Firm* — Harness, Dickey & Pierce, P.L.C.

(57) ABSTRACT

A position-determining apparatus, such as measuring or surveying instruments, is disclosed. In at least one embodiment, the present invention relates to a tilt sensor for a measuring instrument including a movable housing that is controllably rotatable around a rotational axis, wherein the rotational axis may be positioned so that it deviates from a true vertical axis being parallel with a gravitational axis. In at least one embodiment, the tilt sensor includes a gravity sensitive gradient indicating element arranged such that a surface of the element is positioned orthogonally to the true vertical axis during movements of the measuring instrument, wherein the gravity sensitive gradient indicating element is arranged in connection to the non-rotating base; and a detecting device adapted to produce at least one detecting signal and to receive at least one response signal, wherein a deviation between the rotational axis and the true vertical axis is detectable using the at least one response signal.

17 Claims, 4 Drawing Sheets

TILT SENSOR FOR A MEASURING INSTRUMENT

FIELD OF THE INVENTION

The present invention relates to a position-determining apparatus such as measuring or surveying instruments. More particularly, the present invention relates to a tilt sensor for a measuring instrument.

BACKGROUND

The art of surveying involves the determination of unknown positions, surfaces or volumes of objects or setting out of known coordinates using angle and distance measurements taken from one or more positions. In order to make these measurements, a surveying device frequently used is a distance measuring instrument with an integrated distance and angular measurement of the type which is called a total station, i.e. with combined electronic, optical and computer techniques. A total station is furthermore provided with a computer or control unit with writable information for measurements to be performed and for storing data obtained during the measurements. Preferably, the total station calculates the position of a target in a fixed ground-based coordinate system.

In, for example, WO 2004/057269 by the same applicant, such a total station is described in more detail. Generally, a measuring or surveying instrument of the type commonly referred to as a total station or theodolite includes, with reference to FIG. 1, a movable unit 20 including optical equipment indicated with a lens 30, for example, a camera for capturing a field of view and an identified target point within the field of view. The movable unit 20 is supported in a housing 40 in such manner that it is pivotable relatively to the housing 40 around a first axis 50, as indicated by double arrow 60. The first axis 50 also may be referred to as the trunnion axis. The housing 40 is rotatable relatively to a base 80 around a second axis 90 as indicated by double arrow 100. The housing may also be referred to as the alidade portion 40. Thus, by rotating the movable unit 20 around the two axes 50 and 90 the movable unit 40 can be oriented in any desired position for the purpose of carrying out an intended surveying operation. When performing distance measuring or surveying tasks using a distance measuring total station, for example, at a work site, naval work site, a construction work site or a mining work site, a high degree of accuracy is required, with acceptable tolerances measured in arc-seconds for angles and millimetres for distance. The trunnion axis 50 is, in an ideal case, always perpendicular to the second axis 90. Furthermore, the second axis 90 is, in the ideal case, vertical. Unfortunately, however, there will often be deviation in the real case, which may influence or affect the accuracy and reliability of the measurements-to-be-performed. In order to determine the deviation between the second axis 90 and a true vertical line (defined by the gravity field) 120, illustrated in FIG. 2, a tilt sensor is arranged in the housing 40 of the total station. The tilt sensor is adapted to determine the relationship between the vertical axis of the instrument (i.e. the total station) and the true vertical line. Thereby, it is possible to compensate for the deviation. In prior art total stations, a common tilt sensor comprises a vessel filled with a fluid. The fluid is free to move so that if the tilt sensor is not level, the detection device is not orthogonal to the surface. The detection device may consist of a light emitter, for example, a LED emits a light beam which is reflected against the surface of the fluid and the reflected beam is directed to a light sensor, for example, a CCD-chip. The CCD-chip measures where the light centre of the incident light beam is located and thus it is possible to determine the deviation between the second axis 90 and the true vertical axis by determining the deviation of the measured light centre of the incident light beam and a reference point.

However, the prior art tilt sensor is rather slow due to the fact that after a movement of the housing 40, a settling time is required to allow for the fluid to orient since it will swish about in the vessel during a period of time after a movement. Thus, a damping time is required before the deviation measurements can be initiated and a deviation determination can be delivered.

Other types of tilt sensors of the prior art, for example, a tilt sensor comprising a balance plate arranged in proximity to capacitive sensors where the distance between respective sensor and the plate is measured by means of the capacitance or a tilt sensor including an element suspended by wires are also associated with the same disadvantage, i.e. that the movement influences the sensor such that a damping time is required.

Accordingly, there is a need within the art of an improved tilt sensor that is capable of providing faster deviation measurements.

SUMMARY OF THE PRESENT INVENTION

Thus, an object of the present invention is to provide an improved tilt sensor that is capable of providing faster deviation measurements.

Another object of the present invention is to provide an improved tilt sensor in which the damping time can be significantly reduced or eliminated.

A further object of the present invention is to provide an improved tilt sensor that offers increased accuracy and reliability of the measurement results.

These and other objects of the present invention are achieved by a tilt sensor for a measuring instrument and a measuring instrument having the features defined in the independent claims. Certain embodiments are characterized by the dependent claims.

In order to clarify, the term "total station" used herein refers to a distance measuring instrument with an integrated distance and angular measurement, i.e. with combined electronic, optical and computer techniques. Such an instrument gives both the distance as well as the vertical and horizontal direction towards a target, whereby the distance is measured against an object or target such as a reflector. The term "total station" as used herein includes the following terms: survey unit, measuring instrument, surveying instrument or geodetic instrument.

According to a first aspect of the present invention there is provided a tilt sensor for a measuring instrument having a movable housing that is controllably rotatable around a rotational axis in relation to a non-rotating base including a spindle being parallel with the axis. The rotational axis may be positioned so that it deviates from a true vertical axis being parallel with a gravitational axis (i.e. the gravity field). The tilt sensor comprises a gravity sensitive gradient indicating element arranged such that a surface of the element is positioned orthogonally to the true vertical axis during movements of the measuring instrument, wherein the gravity sensitive gradient indicating element is arranged in connection to the non-rotating base. The tilt sensor further comprises a detecting device adapted to produce at least one detecting signal and to receive at least one response signal from the gravity sensitive gradient indicating element, wherein a deviation between the rotational axis and the true vertical axis can be detected using the at least one response signal.

According to a second aspect of the present invention there is provided a measuring instrument for distance and angle measurements comprising a tilt sensor. The measuring instrument includes a movable housing that is controllably rotatable around a rotational axis in relation to a non-rotating base including a spindle being parallel with the axis, wherein the rotational axis may be positioned so that it deviates from a true vertical axis being parallel with a gravitational axis. The tilt sensor comprises a gravity sensitive gradient indicating element arranged such that a surface of the element is positioned orthogonally to the true vertical axis during movements of the measuring instrument, wherein the gravity sensitive gradient indicating element is arranged in connection to the non-rotating base. Furthermore, the tilt sensor comprises a detecting device adapted to produce at least one detecting signal and to receive at least one response signal from the gravity sensitive gradient indicating element, wherein a deviation between the rotational axis and the true vertical axis can be detected using the at least one response signal.

Thus, the present invention is based on the idea of separating the gravity sensitive gradient indicating element from the rotating housing or alidade part of the instrument. Thereby, the gravity sensitive gradient indicating element will remain stationary (i.e. oriented with respect to the gravitational field) during movement of the alidade part during, for example, measurements and disturbances from acceleration forces acting on the gradient indicating element resulting from the rotation of the instrument can thus be eliminated. This entails that the speed of the measurements can be increased since the damping time is eliminated or at least significantly reduced. A further advantage is that the instrument can be calibrated in the field, i.e. when placed on a e.g. work site, in a more efficient manner. Furthermore, due to the increased speed of the measurements, the calibration of the instrument can be updated more often resulting in an increased accuracy and reliability of the measurement results.

According to a preferred embodiment of the present invention, the gravity sensitive gradient indicating element is arranged at the spindle and is centred about the spindle such that the gravity sensitive gradient indicating element is arranged in a non-rotating manner.

In a further embodiment of the present invention, the gravity sensitive gradient indicating element includes a sealed vessel containing a reflective fluid, wherein the vessel is positioned such that a surface of the fluid is orthogonal to the true vertical axis during movements of the measuring instrument due to the influence of the gravitational force acting on the fluid.

According to another embodiment of the present invention, the vessel comprises a light transmitting arrangement and wherein the detecting device comprises a signal producing element including a light emitter adapted to emit a light beam into the vessel via the light transmitting arrangement and a signal detector including a light sensor adapted to receive a light beam reflected at the surface of the liquid of the vessel via the light transmitting arrangement, wherein a deviation between the rotational axis and the true vertical axis can be detected by the light sensor by determining a deviation between a centre point of the reflected light beam and a reference point of the light sensor.

In a further embodiment of the present invention, the gravity sensitive gradient indicating element includes a pivotally arranged capacitive element arranged such that a surface of the element is orthogonal to the true vertical axis during movements of the measuring instrument, and wherein the detecting device comprises at least one capacitive element and a detector adapted to sense a capacitance between the elements, wherein a deviation between the rotational axis and the true vertical axis can be detected by the detector by determining a change in capacitance between the elements.

According to an embodiment of the present invention, the vessel comprises a light transmitting arrangement and wherein the detecting device comprises a signal producing element including a light emitter adapted to emit a light beam into the vessel via a prism element of the detecting device and the light transmitting arrangement and a signal detector including a light sensor adapted to receive a light beam reflected at the surface of the liquid of the vessel via the prism element and the light transmitting arrangement, wherein a deviation between the rotational axis and the true vertical axis can be detected by the light sensor by determining a deviation between a centre point of the reflected light beam and a reference point of the light sensor.

The features that characterize the invention, both as to organization and to method of operation, together with further objects and advantages thereof, will be better understood from the following description used in conjunction with the accompanying drawings. It is to be expressly understood that the drawings is for the purpose of illustration and description and is not intended as a definition of the limits of the invention. These and other objects attained, and advantages offered, by the present invention will become more fully apparent as the description that now follows is read in conjunction with the accompanying drawings.

BRIEF DESCRIPTION OF THE DRAWINGS

In the following detailed description, reference will be made to the accompanying drawings, of which.

DETAILED DESCRIPTION OF THE PRESENT INVENTION

The present invention will hereinafter be described in connection with a measuring instrument, such as a three dimensional scanning device, a total station or a geodetic instrument. A total station is a distance measuring instrument with an integrated distance and angular measurement, i.e. with combined electronic, optical and computer techniques. Such a total station gives both the distance as well as the vertical and horizontal direction towards an object or a target, whereby the distance is measured against a reflecting surface or a reflector, e.g. of the corner cube type. A total station is furthermore provided with a computer or control unit with writable information for measurements to be performed and for storing data obtained during the measurements. Preferably, the total station calculates the position of a target in a fixed ground-based coordinate system. In, for example, WO 2004/057269 by the same applicant, such a total station is described in more detail. A three dimensional scanning device is a distance measuring instrument with an integrated distance and angular measurement, i.e. with combined electronic, optical and computer techniques dedicated to perform the measurements and subsequent data processing in a fast and time-efficient manner.

Figure 1:
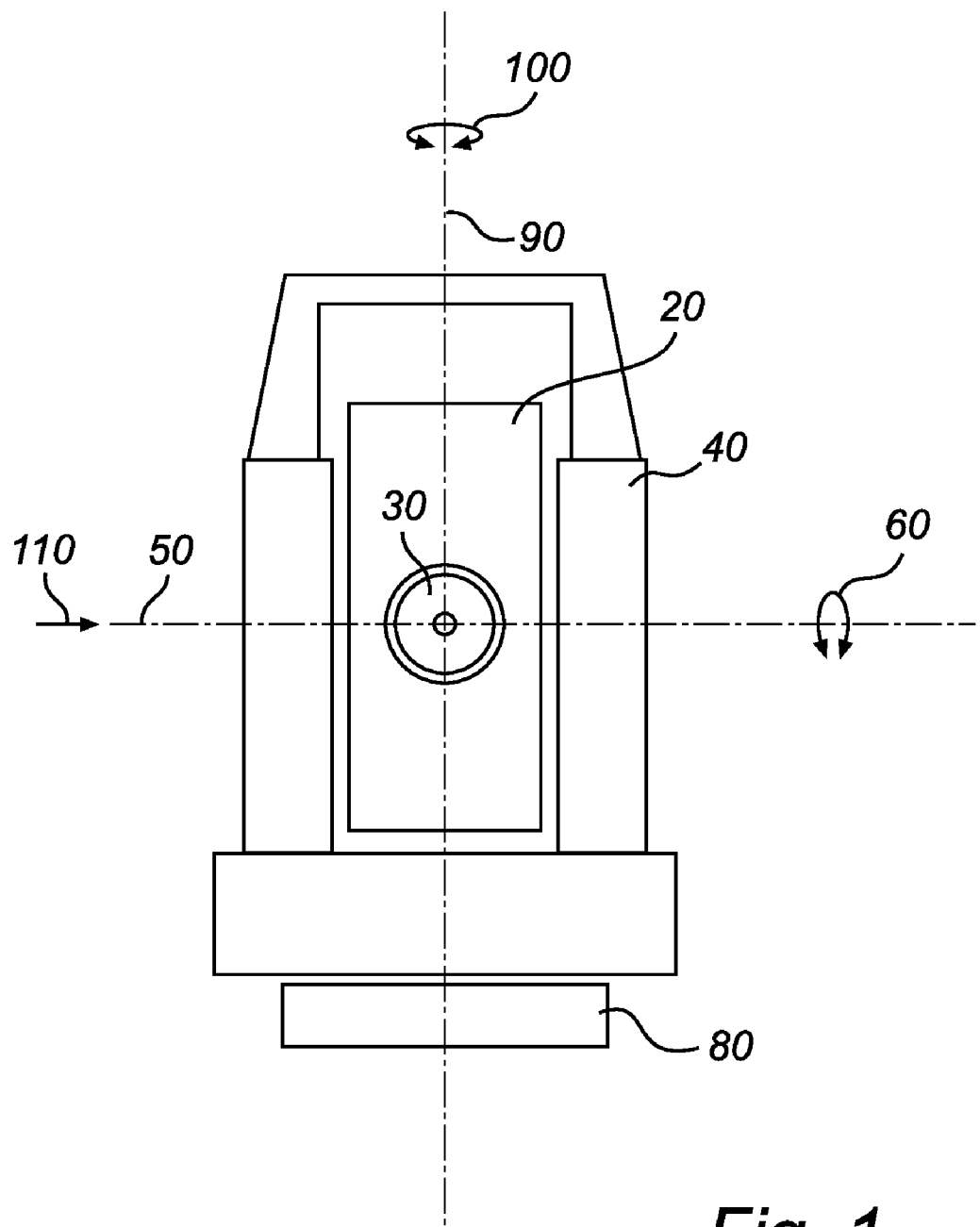
FIG. 1 schematically shows a front view of a measuring instrument according to an embodiment of the present invention.
Figure 2:
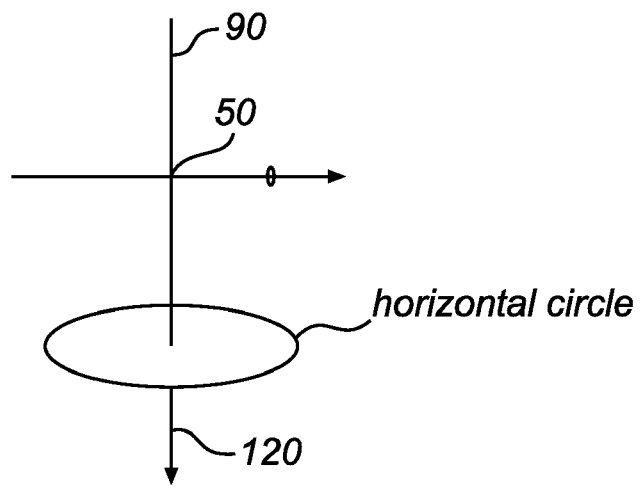
FIG. 2 is a view as seen looking in the direction of arrow 110 in FIG. 1, illustrating various axis in the measuring instrument.

In general, a measuring instrument or total station includes a control unit, including a control logic, and a position calculation circuit including arrangements for sending out measuring beams for distance and alignment measurements and sensor arrangements for receiving reflected beams from target of an object or an individual target. The position calculation circuit comprises an angle measuring system adapted to measure a horizontal angel to the target and a vertical angle to the target. Further, the position calculation circuit comprises a distance measuring system adapted to measure the distance to the target and a tracker/servo system adapted to control the movement of the total station and to aim at the target As described above with reference to FIGS. 1 and 2, a high degree of accuracy is required, with acceptable tolerances measured in arc-seconds for angles and millimetres for distance, when performing distance measuring or surveying tasks using a distance measuring total station, for example, at a work site, naval work site, a construction work site or a mining work site. The trunnion axis 50 is, in an ideal case, always perpendicular to the second axis 90. Furthermore, the second axis 90 is, in the ideal case, vertical. Unfortunately, however, there will often be deviation in the real case, which may influence or affect the accuracy and reliability of the measurements-to-be-performed. In order to determine the deviation between the second axis 90 and a true vertical line 120 being parallel with the gravity field, illustrated in FIG. 2, a tilt sensor is arranged in the housing 40 of the total station, which tilt sensor is adapted to determine the relationship between the vertical axis of the instrument (i.e. the total station) and the true vertical line. Thereby, it is possible to compensate for the deviation.

In the following description of embodiments similar features in different embodiments will be indicated by the same reference numerals.

Figure 3:
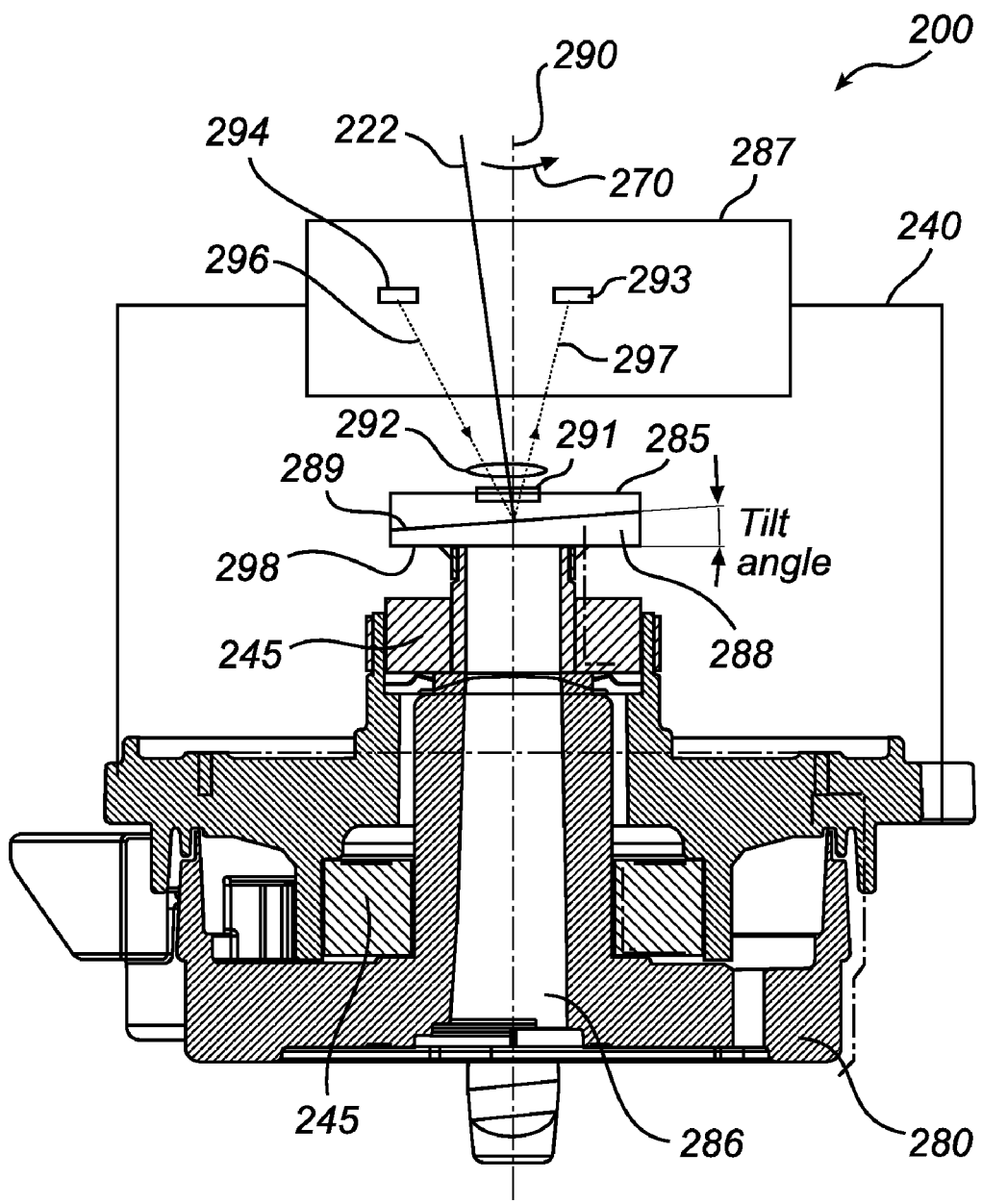
FIG. 3 is a schematic sectional view of another embodiment of the present invention.

Turning now to FIG. 3, one embodiment of the tilt sensor according to the present invention will be described in connection with a measuring instrument. The measuring instrument 200 such as a three dimensional scanning device, a total station or a geodetic instrument includes a movable housing or alidade portion 240 that is mounted at ball bearings 245 and a spindle 286 and which housing 240 controllably rotatable around an axis 290, as indicated by an arrow 270, relatively to a non-rotating base 280. A movable unit 20 (see FIG. 1) including optical equipment indicated with a lens 30, for example, a camera for capturing a field of view and an identified target point within the field of view and the position calculation circuit may be supported in the housing 240 in such manner that it is pivotable relatively to the housing 240 around a first axis 50, as indicated by double arrow 60, see FIG. 1. The first axis 50 also may be referred to as the trunnion axis.

The tilt sensor according to this embodiment comprises a gravity sensitive gradient indicating element 285 arranged such that a surface of the element is positioned orthogonally to the gravity field during movements of the measuring instrument 200, wherein the gravity sensitive gradient indicating element is arranged in connection to the non-rotating base 280. Further, the tilt sensor comprises a detecting device 287 adapted to produce at least one detecting signal and to receive at least one response signal, wherein a deviation between an axis 290 being parallel with the spindle 286 and a true vertical axis 222, i.e. parallel to the gravity field, can be detected using the at least one response signal. As can be seen in FIG. 3, there is such a deviation between the true axis 222 and the first vertical axis 290 as indicated by a tilt angle, i.e. the surface 289 of the fluid is not orthogonal or perpendicular to the axis 290.

According to this embodiment, the gravity sensitive gradient indicating element 285 is arranged at the spindle 286 and is centred about the spindle 286 such that the gravity sensitive gradient indicating element is arranged in a non-rotating manner.

The gravity sensitive gradient indicating element 285 includes a sealed vessel 285 containing a fluid 288. The surface 289 of the fluid 288 is orthogonal (or perpendicular) to the gravity field, i.e. orthogonal to the vertical axis 222, during movements of the measuring instrument 200. In this embodiment, the vessel 285 contains silicone oil, but other fluids having a high viscosity may also be used. The surface 289 of the fluid 288 is substantially still, i.e. substantially level, during the movements of the instrument 200 thereby allowing a faster tilt sensor since, in principle, no damping time is required. The detecting device 287 comprises a signal producing element 294, for example, a light emitting diode adapted to emit a light beam 296 into the vessel 285 via a lens arrangement 292, a light transmitting element 291 and a signal detector 293, for example, a CCD-chip or a CMOS sensor adapted to receive a light beam 297 reflected at the surface 289 of the liquid 288 of the vessel 285 via the lens arrangement 292 and a light transmitting element 291. The surface 289 will always be orthogonal to the gravitational axis (gravity field) or the true vertical axis 222, i.e. perpendicular to the gravity field, and a deviation between the axis 290 being parallel to the spindle 286 and the true vertical axis 222 can be detected by the light sensor 293 by determining a deviation between a centre point of the reflected light beam 297 and a reference point of the light sensor 293.

Figure 4:
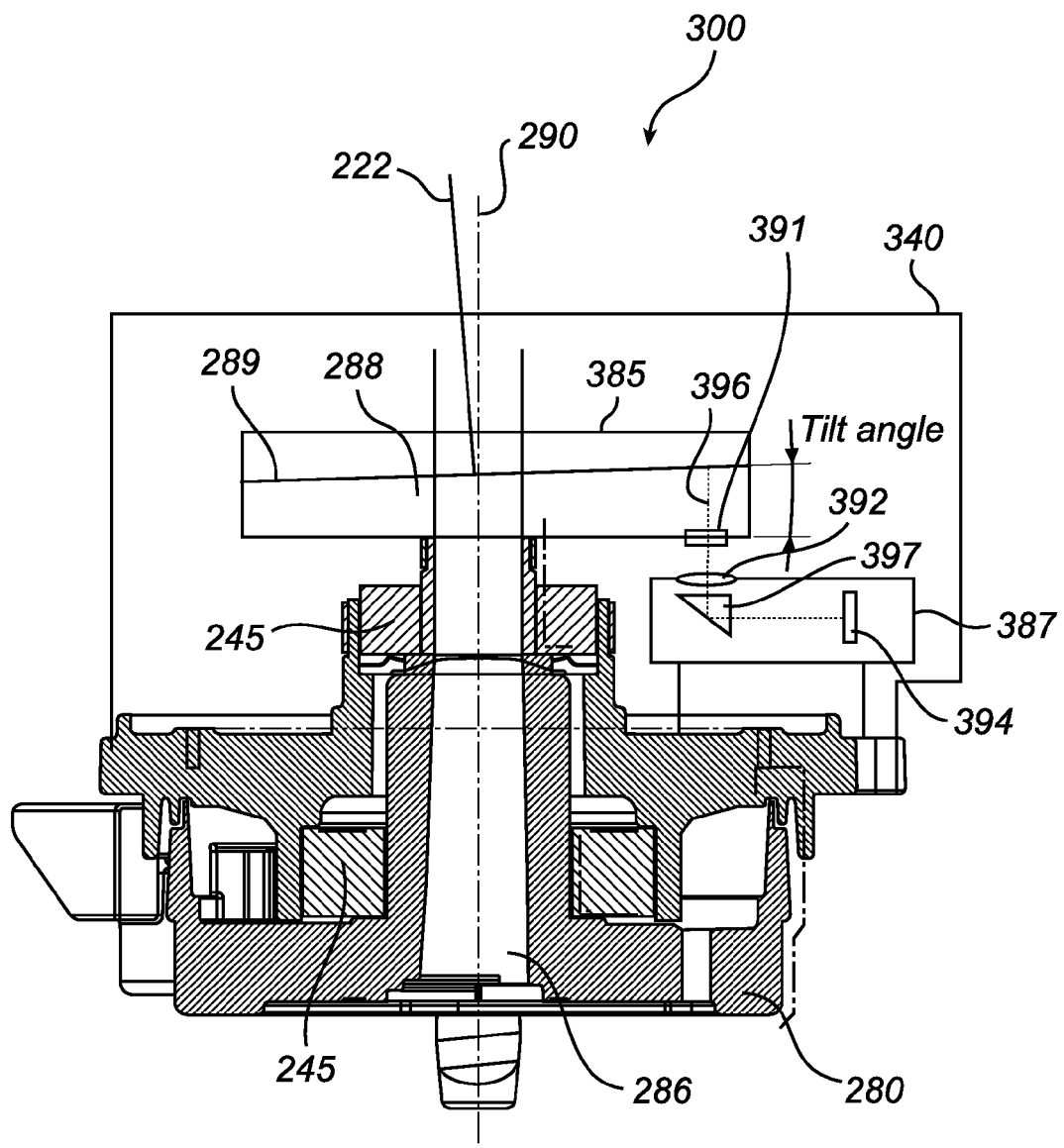
FIG. 4 is a schematic sectional view of a further embodiment of the present invention.

With reference now to FIG. 4, a further embodiment of the tilt sensor according to the present invention will be discussed. The embodiment of the tilt sensor will be described in connection with a measuring instrument. The measuring instrument 300 such as a three dimensional scanning device, a total station or a geodetic instrument includes a movable housing or alidade portion 340 that is mounted at ball bearings 245 and a spindle 286 and which housing 340 controllably rotatable around an axis 290, as indicated by an arrow 270, relatively to a non-rotating base 280. A movable unit 20 (see FIG. 1) including optical equipment indicated with a lens 30 (see FIG. 1), for example, a camera for capturing a field of view and an identified target point within the field of view and the position calculation circuit may be supported in the housing 340 in such manner that it is pivotable relatively to the housing 340 around a first axis 50, as indicated by double arrow 60, (see FIG. 1). The first axis 50 also may be referred to as the trunnion axis.

The tilt sensor according to this embodiment comprises a gravity sensitive gradient indicating element 385 arranged such that a surface of the element is positioned orthogonally to the gravity field during movements of the measuring instrument 300, wherein the gravity sensitive gradient indicating element 385 is arranged in connection to the non-rotating base 280. Further, the tilt sensor comprises a detecting device 387 adapted to produce at least one detecting signal and to receive at least one response signal, wherein a deviation between an axis 290 being parallel with the spindle 286 and a true vertical axis 222 being parallel with the force of gravity can be detected using the at least one response signal. According to this embodiment, the gravity sensitive gradient indicating element 385 is arranged at the spindle 286 and is centred about the spindle 286 such that the gravity sensitive gradient indicating element 385 is arranged in a non-rotating manner.

The gravity sensitive gradient indicating element 385 includes a sealed vessel 385 containing a fluid 288, wherein the vessel 385 is positioned such that a surface 289 of the fluid 288 is orthogonal to the gravity force during movements of the measuring instrument 300. In this embodiment, the vessel 385 contains silicone oil, but other fluids having a high viscosity may also be used. The surface 289 of the fluid 288 is still during the movements of the instrument 300 thereby allowing a faster tilt sensor since, in principle, no damping time is required. The detecting device 387 comprises a signal producing element 394, for example, a light emitting diode adapted to emit a light beam 396 into the vessel 385 via a lens arrangement 392, a light transmitting element 391 and a prism element 397 and a signal detector 394, for example, a CCD-chip or a CMOS sensor adapted to receive a light beam 396 reflected at the surface 289 of the liquid 288 of the vessel 385 via the lens arrangement 392 and a light transmitting element 391. The surface 289 will always be orthogonal to the gravitational axis or the true vertical axis 222, i.e. perpendicular to the gravity force, and a deviation between the axis 290 being parallel to the spindle 286 and the true vertical axis 222 can be detected by the light sensor 394 by determining a deviation between a centre point of the reflected light beam 396 and a reference point of the light sensor 394.

Figure 5:
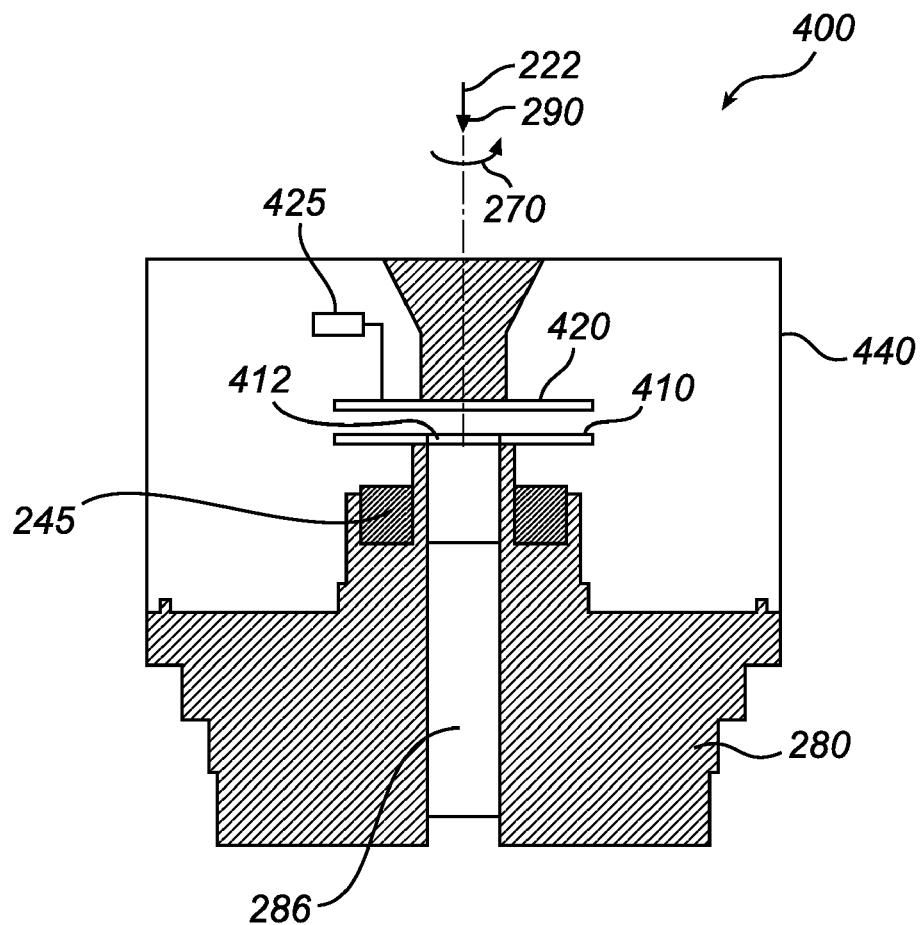
FIG. 5 is a schematic sectional view of yet another embodiment of the present invention.

Turning now to FIG. 5, another embodiment of the tilt sensor according to the present invention will be discussed. The embodiment of the tilt sensor will be described in connection with a measuring instrument. The measuring instrument 400 such as a three dimensional scanning device, a total station or a geodetic instrument includes a movable housing or alidade portion 440 that is mounted at ball bearings 245 and a spindle 286 and which housing 440 controllably rotatable around an axis 290, as indicated by an arrow 270, relatively to a non-rotating base 280. A movable unit 20 (see FIG. 1) including optical equipment indicated with a lens 30 (see FIG. 1), for example, a camera for capturing a field of view and an identified target point within the field of view and the position calculation circuit may be supported in the housing 440 in such manner that it is pivotable relatively to the housing 440 around a first axis 50, as indicated by double arrow 60, (see FIG. 1). The first axis 50 also may be referred to as the trunnion axis.

The tilt sensor according to this embodiment comprises a gravity sensitive gradient indicating element 410 arranged such that a surface of the element is positioned orthogonally to the gravity force during movements of the measuring instrument 400, wherein the gravity sensitive gradient indicating element 410 is arranged in connection to the non-rotating base 280. Further, the tilt sensor comprises a detecting device 420, 425 adapted to produce at least one detecting signal and to receive at least one response signal, wherein a deviation between an axis 290 being parallel with the spindle 286 and a true vertical axis 222 being parallel with the force of gravity can be detected using the at least one response signal (in FIG. 5, the vertical axis 222 and the axis 290 are parallel). According to this embodiment, the gravity sensitive gradient indicating element 410 is arranged at the spindle 286 by means of a pivot spring 412 and is centred about the spindle 286 such that the gravity sensitive gradient indicating element 410 is arranged in a non-rotating manner.

The gravity sensitive gradient indicating element 410 is a capacitive element and the detecting device 420, 425 includes a capacitive element 420 and a detector adapted to detect a change in the capacitance between the elements 410 and 420, respectively.

Although exemplary embodiments of the present invention have been shown and described, it will be apparent to those having ordinary skill in the art that a number of changes, modifications, or alterations to the inventions as described herein may be made. Thus, it is to be understood that the above description of the invention and the accompanying drawings is to be regarded as a non-limiting example thereof and that the scope of protection is defined by the appended patent claims.

The invention claimed is:

1. A tilt sensor for a measuring instrument, comprising:
   a movable housing that is controllably rotatable around a rotational axis in relation to a non-rotating base, including a spindle being parallel with said axis, wherein said rotational axis is positionable so as to deviate from a true vertical axis being substantially parallel with the gravity field;
   a gravity sensitive gradient indicating element arranged such that a surface of said element is positioned orthogonally to said true vertical axis during movements of said measuring instrument, wherein said gravity sensitive gradient indicating element is connected to said spindle to ensure that said gravity sensitive gradient indicating element remains stationary relative to the rotation and movement of said movable housing; and
   a detecting device adapted to produce at least one detecting signal and to receive at least one response signal from said gravity sensitive gradient indicating element, wherein a deviation between said rotational axis and said true vertical axis is detectable using said at least one response signal.

2. The tilt sensor according to claim 1, wherein said gravity sensitive gradient indicating element is arranged at said spindle and is centered about said spindle such that said gravity sensitive gradient indicating element is arranged in a non-rotating manner.

3. The tilt sensor according to claim 1, wherein said gravity sensitive gradient indicating element includes a sealed vessel containing a reflective fluid, wherein said vessel is positioned such that a surface of said fluid is orthogonal to said true vertical axis during movements of said measuring instrument, said response signal being a reflected signal in said reflective fluid.

4. The tilt sensor according to claim 3, wherein said vessel comprises a light transmitting arrangement and wherein said detecting device comprises a signal producing element including a light emitter adapted to emit a light beam into said vessel via said light transmitting arrangement and a signal detector including a light sensor adapted to receive a light beam reflected at said surface of said liquid of said vessel via said light transmitting arrangement, wherein a deviation between said rotational axis and said true vertical axis is detectable by said light sensor by determining a deviation between a center point of said reflected light beam and a reference point of said light sensor.

5. The tilt sensor according to claim 1, wherein said gravity sensitive gradient indicating element includes a pivotally arranged capacitive element arranged such that a surface of said element is orthogonal to said true vertical axis during movements of said measuring instrument, and wherein said detecting device comprises at least one capacitive element and a detector adapted to sense a capacitance between said elements, wherein a deviation between said rotational axis and said true vertical axis is detectable by said detector by determining a change in capacitance between said elements.

6. The tilt sensor according to claim 3, wherein said vessel comprises a light transmitting arrangement and wherein said detecting device comprises a signal producing element including a light emitter adapted to emit a light beam into said, vessel via a prism element of said detecting device and said light transmitting arrangement and a signal detector including a light sensor adapted to receive a light beam reflected at said surface of said liquid of said vessel via said prism element and said light transmitting arrangement, wherein a deviation between said rotational axis and said true vertical axis is detectable by said light sensor by determining a deviation between a center point of said reflected light beam and a reference point of said light sensor.

7. A measuring instrument for distance and angle measurements, comprising:
   a tilt sensor;
   a movable housing that is controllably rotatable around a rotational axis in relation to a non-rotating base, including a spindle being parallel with said axis, wherein said rotational axis is positionable so as to deviate from a true vertical axis being substantially parallel with the gravity field, said tilt sensor comprising a gravity sensitive gradient indicating element arranged such that a surface of said element is positioned orthogonally to the true vertical axis during movements of said measuring instrument, wherein said gravity sensitive gradient indicating element is connected to said spindle to ensure that the gravity sensitive gradient indicating element remains stationary relative to the rotation and movement of said movable housing; and
   a detecting device, adapted to produce at least one detecting signal and to receive at least one response signal from said gravity sensitive gradient indicating element, wherein a deviation between said rotational axis and said true vertical axis is detectable using said at least one response signal.

8. The measuring instrument according to claim 7, wherein said gravity sensitive gradient indicating element is arranged at said spindle and is centered about said spindle such that said gravity sensitive gradient indicating element is arranged in a non-rotating manner.

9. The measuring instrument according to claim 7, wherein said gravity sensitive gradient indicating element includes a sealed vessel containing a reflective fluid, wherein said vessel is positioned such that a surface of said fluid is orthogonal to said true vertical axis during movements of said measuring instrument.

10. The measuring instrument according to claim 9, wherein said vessel comprises a light transmitting arrangement and wherein said detecting device comprises a signal producing element including a light emitter adapted to emit a light beam into said vessel via said light transmitting arrangement and a signal detector including a light sensor adapted to receive a light beam reflected at said surface of said liquid of said vessel via said light transmitting arrangement, wherein a deviation between said rotational axis and said true vertical axis is detectable by said light sensor by determining a deviation between a center point of said reflected light beam and a reference point of said light sensor.

11. The measuring instrument according to claim 7, wherein said gravity sensitive gradient indicating element includes a pivotally arranged capacitive element arranged such that a surface of said element is orthogonal to said true vertical axis during movements of said measuring instrument, and wherein said detecting device comprises at least one capacitive element and a detector adapted to sense a capacitance between said elements, wherein a deviation between said rotational axis and said true vertical axis is detectable by said detector by determining a change in capacitance between said elements.

12. The measuring instrument according to claim 9, wherein said vessel comprises a light transmitting arrangement and wherein said detecting device comprises a signal producing element including a light emitter adapted to emit a light beam into said vessel via a prism element of said detecting device and said light transmitting arrangement and a signal detector including a light sensor adapted to receive a light beam reflected at said surface of said liquid of said vessel via said prism element and said light transmitting arrangement, wherein a deviation between said rotational axis and said true vertical axis is detectable by said light sensor by determining a deviation between a center point of said reflected light beam and a reference point of said light sensor.

13. The tilt sensor according to claim 2, wherein said gravity sensitive gradient indicating element includes a sealed vessel containing a reflective fluid, wherein said vessel is positioned such that a surface of said fluid is orthogonal to said true vertical axis during movements of said measuring instrument, said response signal being a reflected signal in said reflective fluid.

14. The tilt sensor according to claim 2, wherein said gravity sensitive gradient indicating element includes a pivotally arranged capacitive element arranged such that a surface of said element is orthogonal to said true vertical axis during movements of said measuring instrument, and wherein said detecting device comprises at least one capacitive element and a detector adapted to sense a capacitance between said elements, wherein a deviation between said rotational axis and said true vertical axis is detectable by said detector by determining a change in capacitance between said elements.

15. A measuring instrument comprising the tilt sensor according to claim 1.

16. The measuring instrument according to claim 8, wherein said gravity sensitive gradient indicating element includes a sealed vessel containing a reflective fluid, wherein said vessel is positioned such that a surface of said fluid is orthogonal to said true vertical axis during movements of said measuring instrument.

17. The measuring instrument according to claim 8, wherein said gravity sensitive gradient indicating element includes a pivotally arranged capacitive element arranged such that a surface of said element is orthogonal to said true vertical axis during movements of said measuring instrument, and wherein said detecting device comprises at least one capacitive element and a detector adapted to sense a capacitance between said elements, wherein a deviation between said rotational axis and said true vertical axis is detectable by said detector by determining a change in capacitance between said elements.

* * * * *